US011958295B2

(12) United States Patent
Oya

(10) Patent No.: US 11,958,295 B2
(45) Date of Patent: Apr. 16, 2024

(54) CARTRIDGE

(71) Applicant: SEIKO EPSON CORPORATION, Tokyo (JP)

(72) Inventor: Shun Oya, Kiso-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 95 days.

(21) Appl. No.: 17/856,446

(22) Filed: Jul. 1, 2022

(65) Prior Publication Data

US 2023/0001700 A1 Jan. 5, 2023

(30) Foreign Application Priority Data

Jul. 2, 2021 (JP) ................................ 2021-110734

(51) Int. Cl.
*B41J 2/175* (2006.01)

(52) U.S. Cl.
CPC ....... *B41J 2/17523* (2013.01); *B41J 2/17596* (2013.01)

(58) Field of Classification Search
CPC .. B41J 2/17503; B41J 2/17513; B41J 2/1752; B41J 2/17523; B41J 2/1754
See application file for complete search history.

(56) References Cited

U.S. PATENT DOCUMENTS

2021/0197573 A1 7/2021 Naito

FOREIGN PATENT DOCUMENTS

| | | | | |
|---|---|---|---|---|
| CN | 113022142 A | 6/2021 | | |
| JP | 2016-187877 A | 11/2016 | | |
| WO | WO-2019026121 A1 * | 2/2019 | ............. | B41J 2/175 |

* cited by examiner

*Primary Examiner* — Scott A Richmond
(74) *Attorney, Agent, or Firm* — Oliff PLC

(57) ABSTRACT

A cartridge detachably mounted in a liquid ejecting apparatus including a liquid introduction portion includes: a liquid supply portion having a supply portion flow path; a valve seat having a valve seat insertion port; a valve body upstream of the valve seat; a biasing member biasing the valve body toward the valve seat; a cap located downstream of the valve seat; and a liquid absorbing material in contact with the cap, in which the cap has a first surface facing the valve seat, a second surface facing the first surface and contacting the liquid absorbing material, a cap insertion port formed over the first and second surfaces, into which the liquid introduction portion is inserted, a groove formed in the first surface and facing the valve seat, and a hole formed over the first and second surfaces and coupled to the groove, and liquid absorbing material is in the hole.

5 Claims, 8 Drawing Sheets

CARTRIDGE

BACKGROUND

1. Technical Field

The present disclosure relates to a cartridge.

2. Related Art

In the related art, a configuration in which a cartridge mounted in a liquid ejecting apparatus is provided with a liquid accommodating portion accommodating a liquid and a liquid supply portion allowing the liquid accommodated in the liquid accommodating portion to circulate toward the liquid ejecting apparatus has been known (for example, JP-A-2016-187877).

The cartridge may be mounted in the liquid ejecting apparatus, and removed from the liquid ejecting apparatus after the liquid is supplied to the liquid ejecting apparatus through the liquid supply portion. In this case, since the liquid adheres to a liquid flow path of the liquid supply portion, the liquid may be dripped from the liquid flow path of the liquid supply portion.

SUMMARY

According to an aspect of the present disclosure, there is provided a cartridge that is detachably mounted in a liquid ejecting apparatus including a liquid introduction portion. The cartridge includes: a liquid accommodating portion for accommodating a liquid; a liquid supply portion having a supply portion flow path that communicates with the liquid accommodating portion; a valve seat arranged on the supply portion flow path and having a valve seat insertion port into which the liquid introduction portion is inserted; a valve body for closing the valve seat insertion port, arranged on the supply portion flow path, the valve body being located upstream of the valve seat in a circulating direction of the liquid in the supply portion flow path when the liquid is supplied; a biasing member arranged on the supply portion flow path and biasing the valve body toward the valve seat; a cap located downstream of the valve seat in the circulating direction; and a liquid absorbing material in contact with the cap. The cap has a first surface facing the valve seat, a second surface facing the first surface and in contact with the liquid absorbing material, a cap insertion port formed over the first surface and the second surface, into which the liquid introduction portion is inserted, a groove formed in the first surface and facing the valve seat, and a hole formed over the first surface and the second surface and coupled to the groove, and the hole is in contact with the liquid absorbing material.

DESCRIPTION OF EXEMPLARY EMBODIMENTS

A. Embodiment

A-1. Configuration of Printing System

Figure 1:
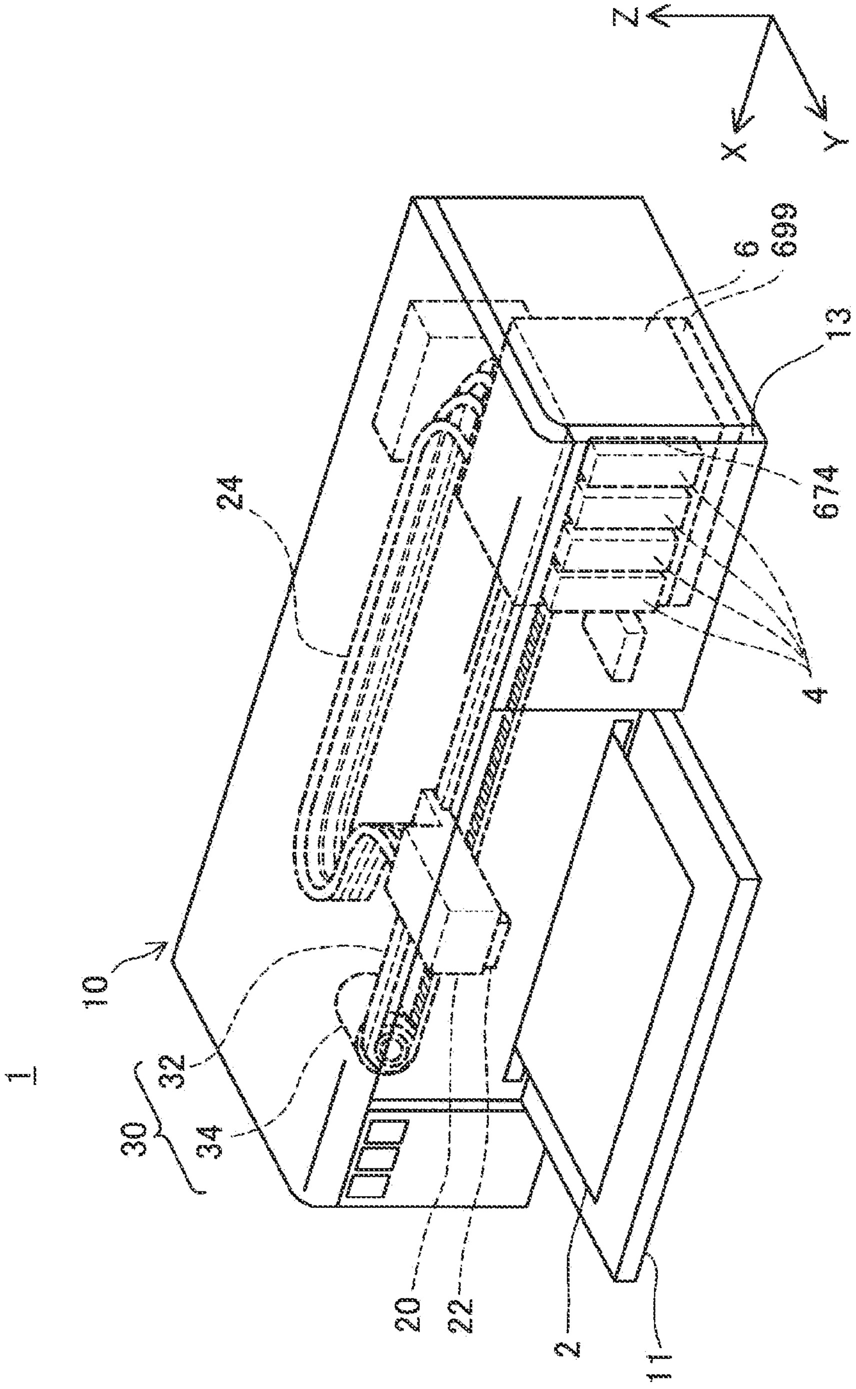
FIG. 1 is a perspective view illustrating a configuration of a printing system.

FIG. 1 is a perspective view illustrating a configuration of a printing system 1 as an embodiment of the present disclosure. In FIG. 1, X, Y, and Z axes, which are three orthogonal spatial axes, are drawn. The directions in which the arrows of the X axis, the Y axis, and the Z axis are directed represent positive directions along the X axis, the Y axis, and the Z axis, respectively. The positive directions along the X axis, the Y axis, and the Z axis are denoted by a +X direction, a +Y direction, and a +Z direction, respectively. The reverse directions of the directions in which the arrows of the X axis, the Y axis, and the Z axis are directed are negative directions along the X axis, the Y axis, and the Z axis, respectively. The negative directions along the X axis, the Y axis, and the Z axis are denoted by a −X direction, a −Y direction, and a −Z direction, respectively. Directions along the X axis, the Y axis, and the Z axis regardless of whether being positive or negative are called an X direction, a Y direction, and a Z direction, respectively. This applies the same to the figures and descriptions to be described later.

The printing system 1 includes a printing apparatus 10 as a liquid ejecting apparatus, and a plurality of cartridges 4 supplying ink, which is a liquid, to the printing apparatus 10. The printing apparatus 10 in the present embodiment is an ink jet printer that discharges the ink, as a liquid, from a discharge head 22. The printing apparatus 10 is a large printer that performs printing on a large-sized sheet such as a poster. The printing apparatus 10 includes a cartridge mounting portion 6, a carriage 20, a discharge head 22, and a drive mechanism 30. The plurality of cartridges 4 in which colors of accommodated ink are different from each other are detachably mounted in the cartridge mounting portion 6.

The printing apparatus 10 has a replacement cover 13 on a front surface thereof in the +Y direction side. When the +Z direction side of the replacement cover 13 is tilted forward, that is, tilted with respect to the +Y direction side, an opening of the cartridge mounting portion 6 appears and the cartridge 4 can be detached. When the cartridge 4 is mounted in the cartridge mounting portion 6, the ink can be supplied to the discharge head 22 that is provided on the carriage 20 via a tube 24 as a liquid circulating tube. In the present embodiment, the ink is supplied from the cartridge 4 to the discharge head 22 with a head difference. Specifically, the ink is supplied to the discharge head 22 due to a head difference between a liquid level of the ink in a liquid storage portion 699 and the discharge head 22. In another embodiment, a pump mechanism (not illustrated) of the printing apparatus 10 may suck the ink in the cartridge 4 to supply the ink to the discharge head 22. The tube 24 is provided for each type of the ink. A state in which the cartridge 4 is mounted in the cartridge mounting portion 6 and the ink, as a liquid, can be supplied to the printing apparatus 10 is referred to as a "mounted state".

A nozzle for each type of ink is provided on the discharge head 22. The discharge head 22 discharges the ink from the nozzle toward a printing sheet 2 and prints data such as characters or images on the printing sheet 2. The discharge head 22 is attached to the carriage 20. In the present embodiment, the printing apparatus 10 is a so-called "offcarriage type" printer in which the cartridge mounting portion 6 is not interlocked with the movement of the carriage 20. The present disclosure can also be applied to a so-called "on-carriage type" printer in which the cartridge mounting portion 6 is provided on the carriage 20 and the cartridge mounting portion 6 moves together with the carriage 20.

The drive mechanism 30 reciprocates the carriage 20 based on a control signal from the control portion. The drive mechanism 30 includes a timing belt 32 and a drive motor 34. The carriage 20 reciprocates in a main scanning direction, which is a direction along the X direction, by transmitting power of the drive motor 34 to the carriage 20 via the timing belt 32. In addition, the printing apparatus 10 includes a transport mechanism for moving the printing sheet 2 in a sub-scanning direction which is the +Y direction. When printing is performed, the transport mechanism moves the printing sheet 2 in the sub-scanning direction, and the printed printing sheet 2 is output onto a front cover 11.

The cartridge 4 is detachably mounted in the printing apparatus 10. The cartridge 4 is guided from an insertion/removal opening portion 674 of the cartridge mounting portion 6 in the −Y direction, and accommodated in the cartridge mounting portion 6.

In the present embodiment, in the use state of the printing system 1, an axis along the sub-scanning direction of transporting the printing sheet 2 is defined as the Y axis, an axis along the gravity direction is defined as the Z axis, and an axis along the movement direction of the carriage 20 is defined as the X axis. Here, "the use state of the printing system 1" refers to a state in which the printing system 1 is installed on a horizontal surface. In the present embodiment, the sub-scanning direction is defined as the +Y direction, a direction opposite to the +Y direction is referred to as the −Y direction, the gravity direction is defined as the −Z direction, and the antigravity direction is defined as the +Z direction. The X direction and the Y direction are directions along the horizontal direction. When the printing system 1 is viewed from a front side, a direction from the left side to the right side is defined as the +X direction, and a direction opposite to the +X direction is defined as the −X direction. In the present embodiment, an insertion direction in which the cartridge 4 is inserted into the cartridge mounting portion 6 for mounting is defined as the −Y direction, and a direction in which the cartridge 4 is removed from the cartridge mounting portion 6 is defined as the +Y direction. Thus, in the cartridge mounting portion 6, a −Y direction side is referred to as a depth side, and a +Y direction side is referred to as a front side. In the present embodiment, an arrangement direction of the plurality of cartridges 4 is defined as the X direction.

Figure 2:
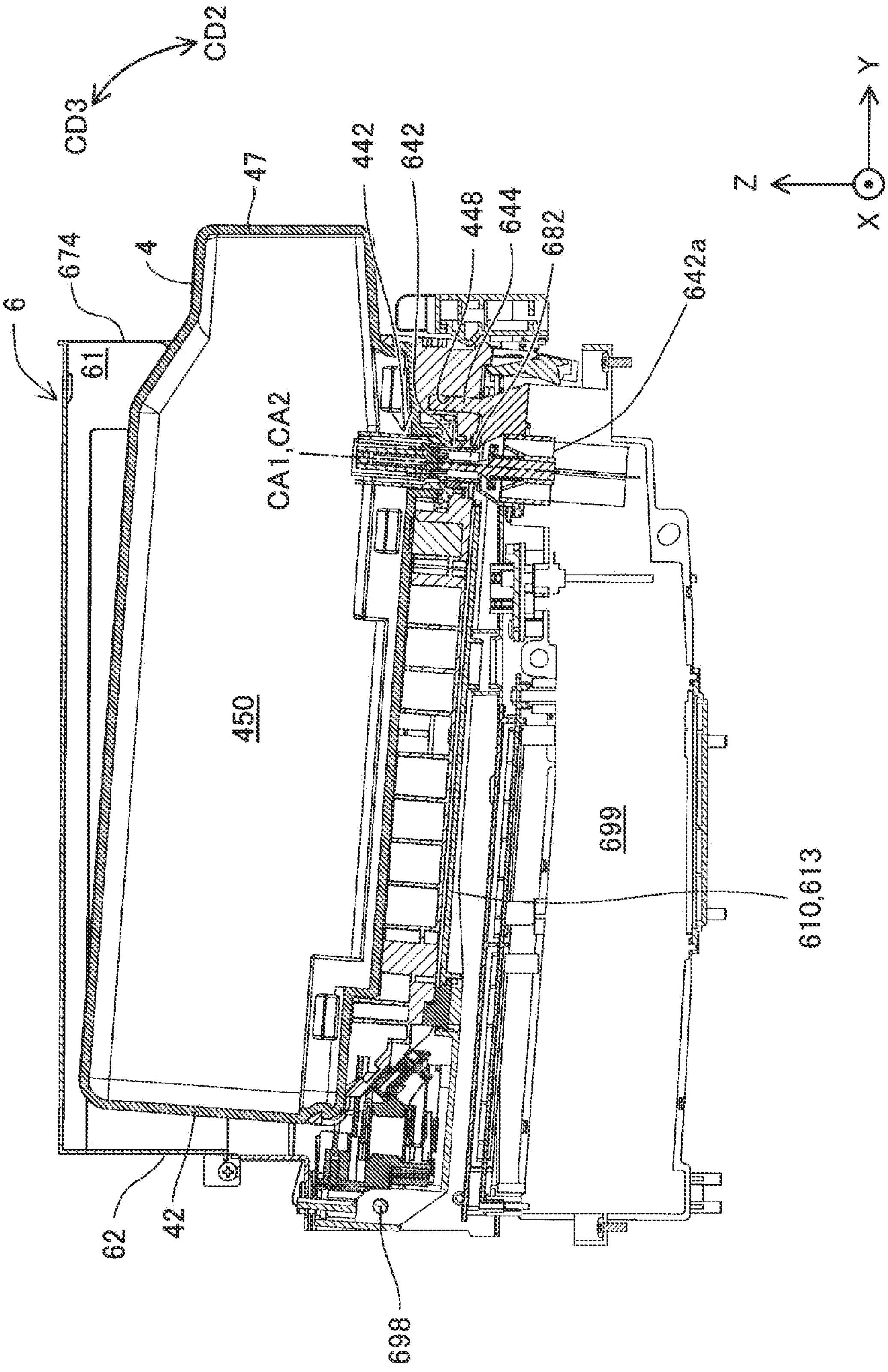
FIG. 2 is a cross-sectional view of a cartridge in a mounted state.

A-2. Description of Cartridge Mounting Portion and Cartridge in Mounted State FIG. 2 is a cross-sectional view of the cartridge 4 and the cartridge mounting portion 6 in the mounted state, taken along a YZ plane that passes through a central axis CA1 of a liquid introduction portion 642 as a cutting plane. As illustrated in FIG. 2, the cartridge 4 is accommodated in an accommodating chamber 61 arranged on the cartridge mounting portion 6 in the mounted state.

The cartridge mounting portion 6 includes the liquid storage portion 699 arranged under the accommodating chamber 61, and the liquid introduction portion 642. The support member 610 forming a bottom wall of the accommodating chamber 61 supports the cartridge 4 from below.

In the mounted state of the cartridge 4, a main wall 613 forming a bottom portion of the support member 610 is tilted with respect to the Y direction. Specifically, the main wall 613 of the support member 610 is tilted so as to be located on the −Z direction side, which is a lower side, toward the +Y direction side. The main wall 613 is in parallel to the Y direction in the initial arrangement state of the cartridge mounting portion 6 in which the cartridge 4 is not mounted.

The liquid storage portion 699 communicates with the discharge head 22 via the tube 24 illustrated in FIG. 1, and also communicates with the liquid introduction portion 642. The liquid storage portion 699 is formed with an atmospheric air inlet (not illustrated) in order to take in the atmosphere. The liquid introduction portion 642 is a cylindrical member, and has an introduction portion flow path 682 for allowing the liquid to circulate therein. A liquid supply portion 442 of the cartridge 4 is coupled to the liquid introduction portion 642 of the cartridge mounting portion 6 in the mounted state in which the cartridge 4 is mounted in the accommodating chamber 61 of the cartridge mounting portion 6.

In addition to the configuration, the cartridge mounting portion 6 has an apparatus-side supply portion positioning portion 644 used for positioning the cartridge 4. The apparatus-side supply portion positioning portion 644 has a substantially rectangular parallelepiped shape. The movement of the liquid supply portion 442 intersecting with the central axis CA2 of the liquid supply portion 442 is restricted by entering an apparatus-side supply portion positioning portion 644, which is a protrusion included in the cartridge mounting portion 6, into a supply portion positioning portion 448 having a recess shape and included in the cartridge 4. As a result, positioning of the liquid supply portion 442 to the liquid introduction portion 642 is performed.

The liquid supply portion 442 of the cartridge 4 is coupled to the liquid introduction portion 642 of the cartridge mounting portion 6 in the mounted state in which the cartridge 4 is mounted in the cartridge mounting portion 6. As a result, the ink accommodated in a liquid accommodating portion 450 of the cartridge 4 is supplied to the liquid introduction portion 642 via the liquid supply portion 442. In the present embodiment, while the ink is supplied from the liquid supply portion 442 to the liquid introduction portion 642, air accommodated in the liquid storage portion 699 becomes bubbles, and the bubbles circulate in the liquid introduction portion 642, the liquid supply portion 442, and the liquid accommodating portion 450. As a result, air-gas exchange in the liquid accommodating portion 450 is performed. In another embodiment, the cartridge 4 has an atmosphere communication path for allowing the liquid accommodating portion 450 to communicate with the outside, and the liquid-gas exchange may be performed via the atmosphere communication path. In this case, the atmosphere communication path is arranged at a different position from the liquid supply portion 442, and for example, is formed on a wall forming the liquid accommodating portion 450.

A central axis CA1 of the liquid introduction portion 642 is in parallel with a central axis CA2 of the liquid supply portion 442 in the mounted state, and tilted with respect to the Z direction. In addition, a direction along the central axis CA2 of the liquid supply portion 442 is a direction along a direction in which the liquid supply portion 442 extends.

A-3. Description of Cartridge

Figure 3:
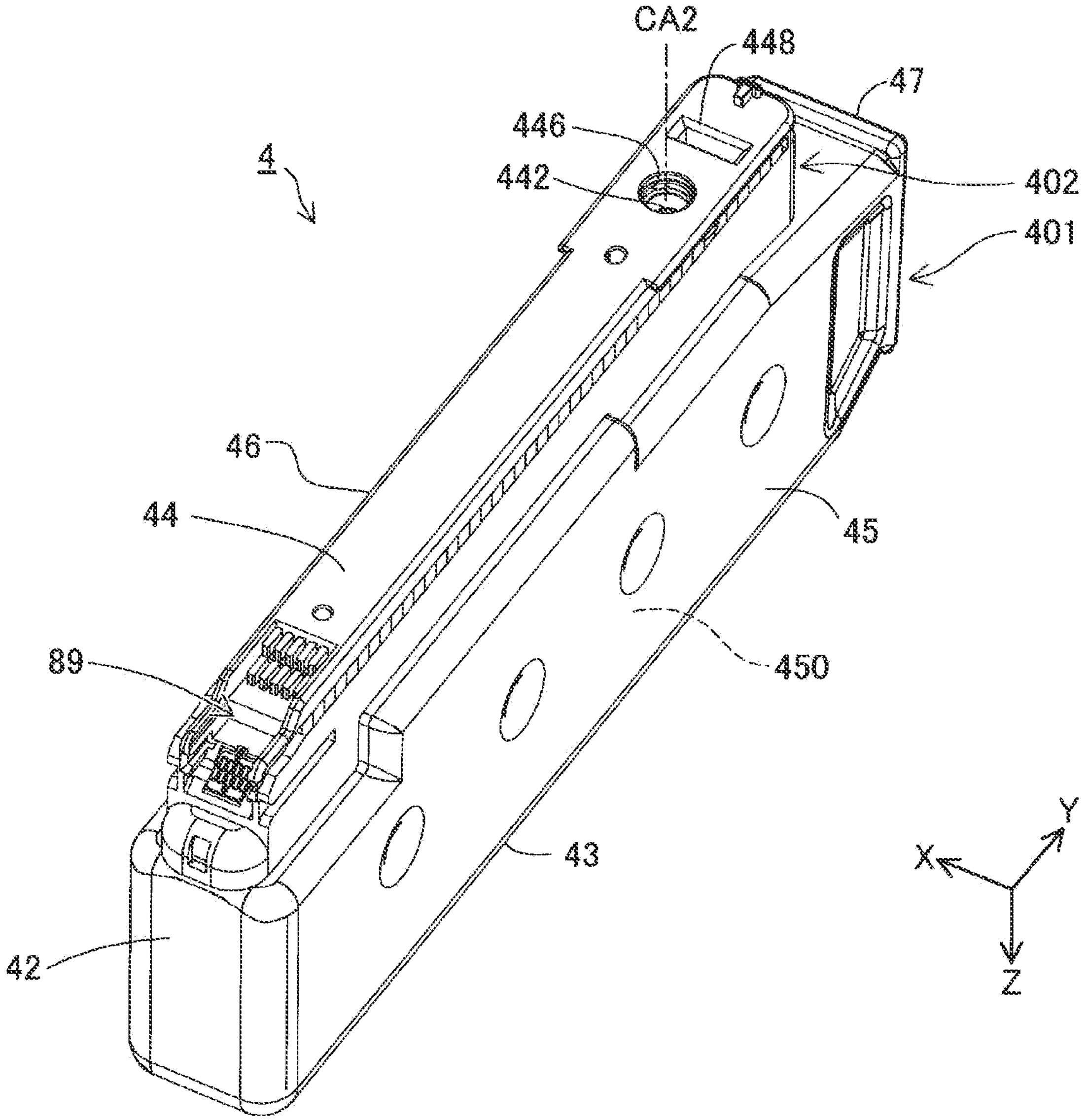
FIG. 3 is a perspective view of the cartridge.

FIG. 3 is a perspective view illustrating the cartridge 4. An appearance of the cartridge 4 has a substantially rectangular parallelepiped shape. In the cartridge 4, a Y direction is referred to as a depth direction, a Z direction is referred to as a height direction, and an X direction is referred to as a width direction. In the appearance of the cartridge 4, a dimension in the Y direction is the largest, and a dimension in the Z direction and a dimension in the X direction become smaller in this order. The cartridge 4 includes a liquid accommodating body 401 and an adapter 402. The adapter 402 is attached to the liquid accommodating body 401 by engagement with the liquid accommodating body 401.

The cartridge 4 has a front wall 42, a rear wall 47, an upper wall 43, a bottom wall 44, a first side wall 45, a second side wall 46, and a corner portion 89. The front wall 42 and the rear wall 47 face each other in the Y direction. The upper wall 43 and the bottom wall 44 face each other in the Z direction. The Z direction is parallel with the central axis CA2 along the direction in which the liquid supply portion 442 extends. The first side wall 45 and the second side wall 46 face each other in the X direction. The upper wall 43 is located on the +Z direction side, and intersects with the front wall 42 and the rear wall 47. The bottom wall 44 is located on the −Z direction side, which is the gravity direction side in the mounted state. The bottom wall 44 intersects with the front wall 42 and the rear wall 47. The corner portion 89 is provided at a corner part where the front wall 42 intersects with the bottom wall 44.

The liquid accommodating body 401 has the liquid accommodating portion 450 and the liquid supply portion 442. The liquid accommodating portion 450, which is a space inside the liquid accommodating body 401, is provided for accommodating the liquid. The liquid supply portion 442 communicating with the liquid accommodating portion 450 is a cylindrical member protruding from the bottom wall 44 of the liquid accommodating body 401 to the adapter 402 side.

The adapter 402 includes a supply portion positioning portion 448 and an opening portion 446. The supply portion positioning portion 448 is a hole extending from a second side wall 46 toward the upper wall 43. The opening portion 446 is an opening formed in the bottom wall 44 in order to insert the liquid supply portion 442 therethrough. A positional relationship in which the opening portion 446 and the liquid supply portion 442 overlap is made, when the cartridge 4 is viewed from the bottom wall 44. In the present embodiment, the liquid supply portion 442 is arranged so that the central axis CA2 of the liquid supply portion 442 passes through the opening portion 446.

A-4. Description of Mounting Method of Cartridge

Figure 4:
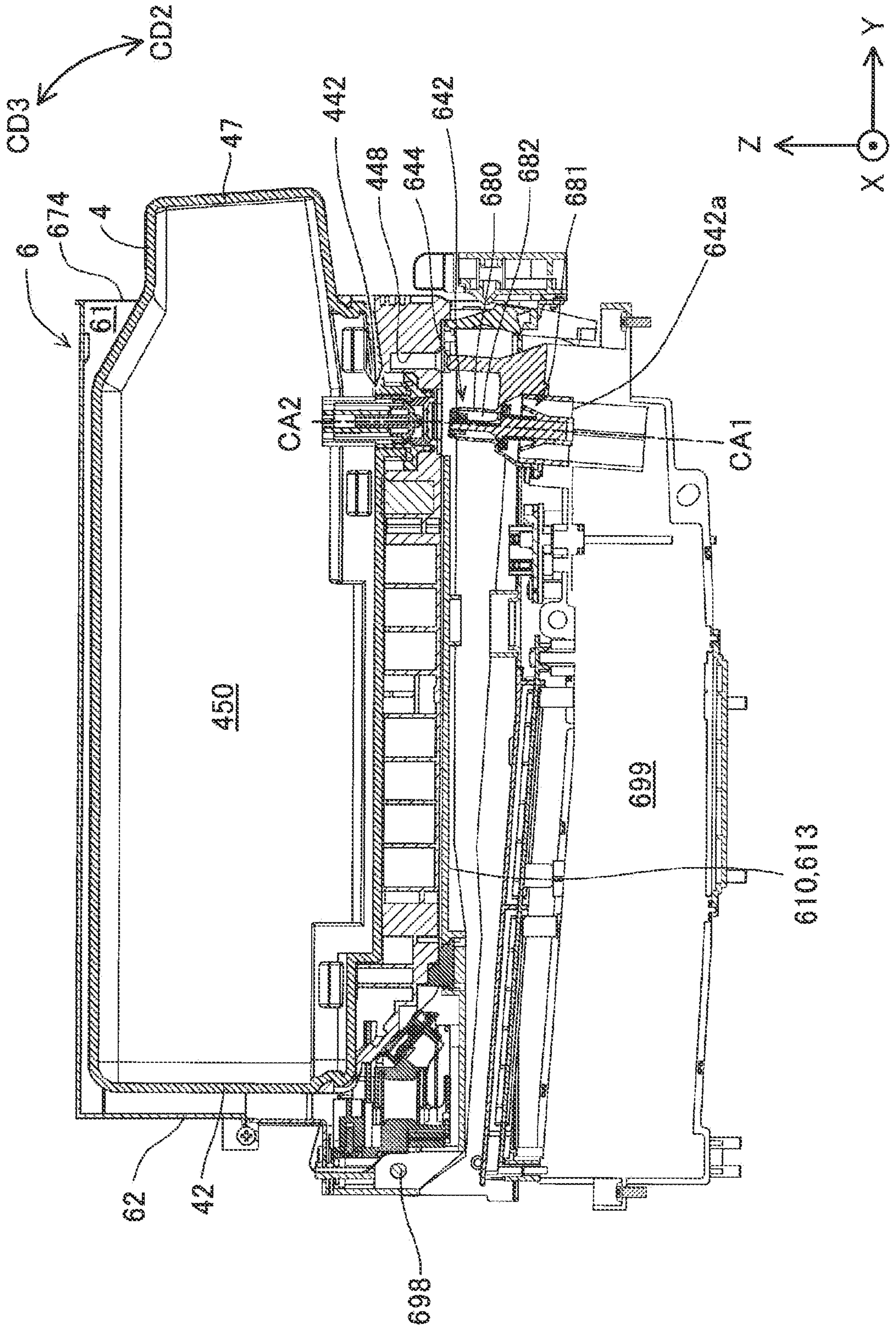
FIG. 4 is a view illustrating a cartridge mounting process.

FIG. 4 is a view illustrating a mounting process of the cartridge 4 in a cartridge mounting portion 6. When the cartridge 4 is mounted in the cartridge mounting portion 6, first, the cartridge 4 is inserted into the accommodating chamber 61 from the insertion/removal opening portion 674 of the cartridge mounting portion 6. As a result, the front wall 42 of the cartridge 4 is positioned as illustrated in FIG. 4. Next, the rear wall 47 side of the cartridge 4 is rotatably moved in a coupling direction CD2 indicated by an arrow based on a rotation fulcrum 698. Accordingly, the liquid supply portion 442 of the cartridge 4 is coupled to the liquid introduction portion 642 of the cartridge mounting portion 6. The rotation fulcrum 698 is provided on a second apparatus wall 62 side of the cartridge mounting portion 6. When the cartridge 4 is removed from the cartridge mounting portion 6, the above procedure is performed reversely. That is, the cartridge 4 is rotatably moved in a coupling direction CD3 indicated by an arrow based on the rotation fulcrum 698, and then taken out from the accommodating chamber 61. As illustrated in FIG. 2, a state in which the liquid supply portion 442 of the cartridge 4 is coupled to the liquid introduction portion 642 of the cartridge mounting portion 6 is referred to as a mounted state. Conversely, as illustrated in FIG. 4 or the cartridge 4 alone, a state in which the liquid supply portion 442 of the cartridge 4 is not coupled to the liquid introduction portion 642 of the cartridge mounting portion 6 is referred to as an unmounted state.

A-5. Detailed Description of Cartridge Mounting Portion and Cartridge

Figure 5:
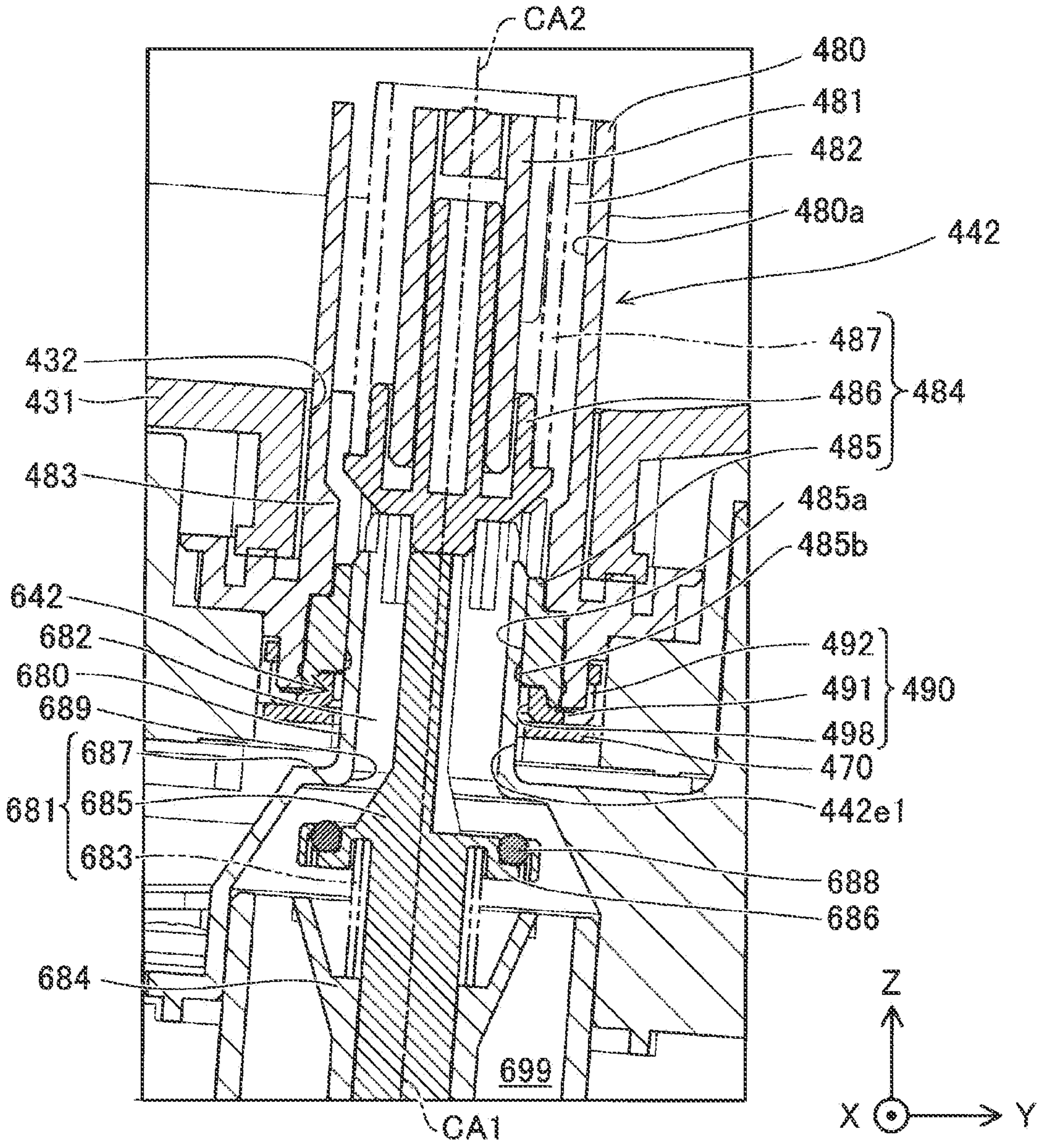
FIG. 5 is an enlarged cross-sectional view of the liquid supply portion in the mounted state.
Figure 6:
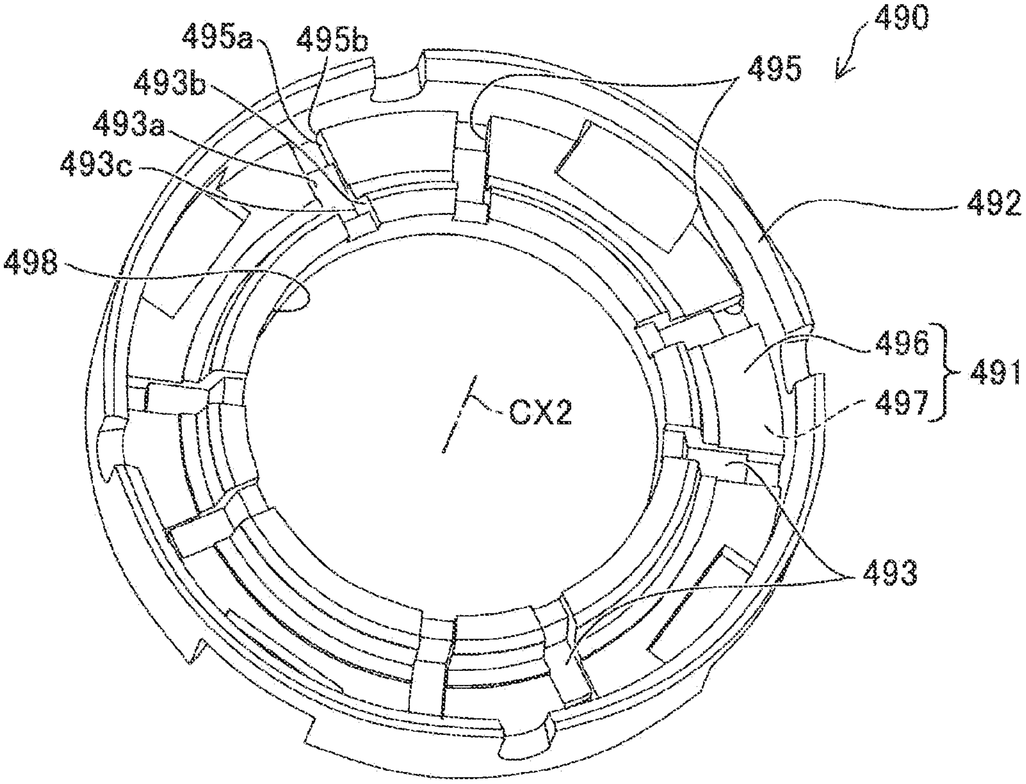
FIG. 6 is a perspective view of a cap.
Figure 7:
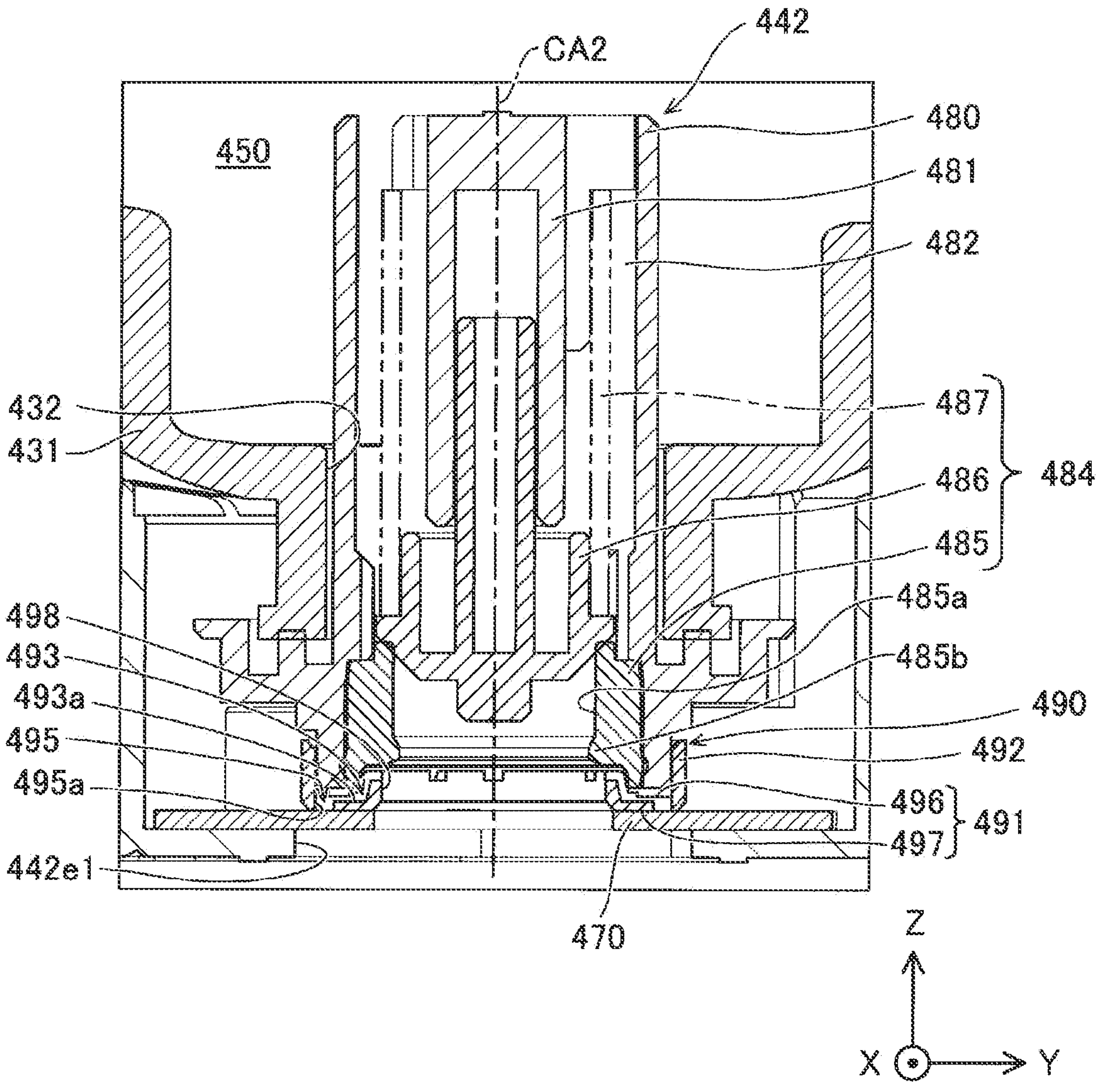
FIG. 7 is an enlarged cross-sectional view of the liquid supply portion in the unmounted state.
Figure 8:
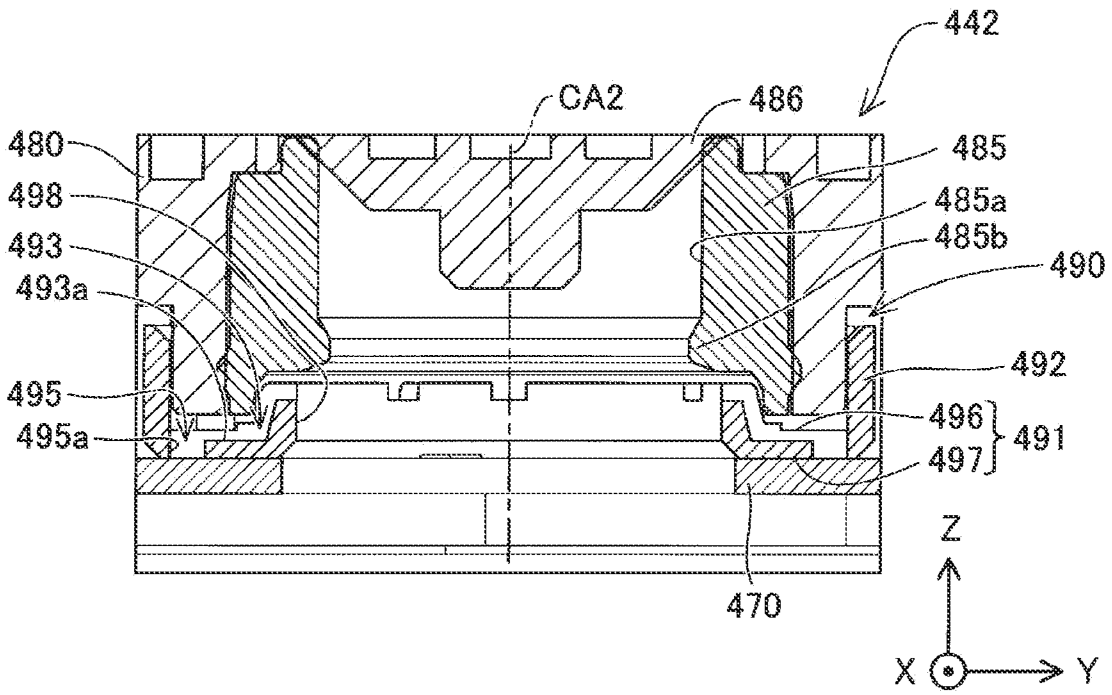
FIG. 8 is an enlarged view of a main part in FIG. 7.

FIG. 5 is an enlarged cross-sectional view of the liquid supply portion 442 and the liquid introduction portion 642 in the mounted state. FIG. 5 is a cross-sectional view taken along a YZ plane that passes through the central axis CA1 and the central axis CA2 as a cutting plane. FIG. 6 is a perspective view of a cap 490. FIG. 7 is an enlarged cross-sectional view of the liquid supply portion 442 in the unmounted state. FIG. 7 is a cross-sectional view taken along a plane that passes through a groove 493 of the cap 490 as a cutting plane. FIG. 8 is an enlarged view of a main part in FIG. 7.

As illustrated in FIG. 7, the liquid supply portion 442 has a supply portion flow path 482 communicating with the liquid accommodating portion 450. The liquid supply portion 442 is inserted through an inflow opening portion 432 that is formed in an accommodating body bottom wall 431 which is a bottom wall of the liquid accommodating portion 450. The liquid supply portion 442 has a substantially cylindrical shape with the central axis CA2. The liquid supply portion 442 has a supply portion flow path 482 in which the liquid circulates. A downstream end of the supply portion flow path 482 is a supply opening 442*el*. In the mounted state, the supply portion flow path 482 is located on the gravity direction side, that is, on a lower side of the liquid supply portion 442 toward the supply opening 442*el*. The liquid supply portion 442 has a housing 480 and a guide portion 481. The housing 480 has a cylindrical shape. A plurality of slits (not illustrated) extending in an axial direction along the central axis CA2 are formed in a part accommodated in the liquid accommodating portion 450 of the housing 480 at intervals in a circumferential direction of the housing 480. The liquid in the liquid accommodating portion 450 flows into the supply portion flow path 482 via the slits.

The guide portion 481 is located inwardly from the housing 480, and extends in the axial direction along the central axis CA2. The guide portion 481 guides a movement of the cartridge-side valve body 486 in the axial direction. The guide portion 481 and the housing 480 are coupled to each other at an end portion of the liquid accommodating portion 450 side in the axial direction.

The liquid supply portion 442 includes a cartridge-side valve mechanism 484 in the supply portion flow path 482. The cartridge-side valve mechanism 484 opens and closes the supply portion flow path 482. The cartridge-side valve mechanism 484 has a cartridge-side valve seat 485 as a valve seat, the cartridge-side valve body 486 as a valve body, and a cartridge-side biasing member 487 as a biasing member.

The cartridge-side valve seat 485 is arranged in the vicinity of a supply opening 442*el*. The cartridge-side valve seat 485 is an annular member. The cartridge-side valve seat 485 is formed of, for example, an elastic member such as a synthetic rubber or elastomer. An outer peripheral surface of the cartridge-side valve seat 485 is airtightly attached to an inner peripheral surface of the housing 480. The cartridge-side valve seat 485 is formed with a valve seat insertion port 485*a* penetrating therethrough in a direction along the central axis CA2. A protruding portion 485*b* that protrudes inward is formed on an inner peripheral surface of the cartridge-side valve seat 485 forming the valve seat insertion port 485*a*. The protruding portion 485*b* is arranged on a downstream end portion of the cartridge-side valve seat 485 in a circulating direction of the liquid in the supply portion flow path 482. Upon mounting of the cartridge 4, the liquid introduction portion 642 is inserted into the valve seat insertion port 485*a*.

The cartridge-side valve body 486 is slidably attached to the liquid supply portion 442 in the axial direction along the central axis CA2. The cartridge-side valve body 486 is a rod-shaped member extending in the direction along the central axis CA2. The cartridge-side valve body 486 is located upstream of the cartridge-side valve seat 485 in a circulating direction of the liquid in the supply portion flow path 482 when the liquid is supplied. Upon unmounting of the cartridge 4, the cartridge-side valve body 486 abuts against the valve seat insertion port 485*a* to close the valve seat insertion port 485*a*. As a result, the cartridge-side valve body 486 is closed.

The cartridge-side biasing member 487 biases the cartridge-side valve body 486 in a direction toward the cartridge-side valve seat 485. The cartridge-side biasing member 487 is, for example, a helical compression spring. One end of the cartridge-side biasing member 487 abuts against the cartridge-side valve body 486, and the other end thereof abuts against the liquid supply portion 442. A space between the inner peripheral surface of the housing 480 and the cartridge-side valve seat 485, and a space between the guide portion 481 and the cartridge-side valve body 486 are the supply portion flow path 482.

The liquid supply portion 442 further has the cap 490 and a liquid absorbing material 470 for absorbing the liquid. The cap 490 is attached downstream of the cartridge-side valve seat 485 in the circulating direction. The liquid absorbing material 470 is attached downstream of the cap 490 in the circulating direction. The liquid absorbing material 470 has a sheet shape, and is a member for holding the liquid by a capillary force. Examples of the liquid absorbing material 470 can include a porous body formed of polyvinyl alcohol, a foaming member such as urethane foam, and a member formed of non-woven fabric. In the present embodiment, a porous body formed of polyvinyl alcohol is used as the liquid absorbing material 470.

As illustrated in FIG. 5, the liquid introduction portion 642 is coupled to the liquid supply portion 442 and receives the liquid from the liquid supply portion 442 in the mounted state of the cartridge 4. The liquid introduction portion 642 has the introduction portion flow path 682 for allowing the liquid supplied from the liquid supply portion 442 to circulate therein. The liquid introduction portion 642 has the central axis CA1. The central axis CA1 is inclined relative to the gravity direction.

The liquid introduction portion 642 includes a hollow introduction portion main body 680 and an apparatus-side valve mechanism 681 arranged in the introduction portion flow path 682. A tip part of the introduction portion main body 680 has a cylindrical shape. The liquid introduction portion 642 includes an introduction portion main body 680 and an apparatus-side valve mechanism 681. The introduction portion main body 680 is hollow, and a tip part thereof has a cylindrical shape. The introduction portion main body 680 has the introduction portion flow path 682 formed therein.

The apparatus-side valve mechanism 681 is located in the introduction portion flow path 682, and opens and closes the introduction portion flow path 682. The apparatus-side valve mechanism 681 has an apparatus-side valve seat 687, an apparatus-side valve body 685, and an apparatus-side biasing member 683 formed by the introduction portion main body 680. The apparatus-side valve seat 687 is a part of the introduction portion main body 680 extending in a direction orthogonal to the central axis CA1. The apparatus-side valve seat 687 has an apparatus-side valve hole 689 which is a part of the introduction portion flow path 682.

The apparatus-side valve body 685 is a rod-shaped member extending in the direction along the central axis CA1. The apparatus-side valve body 685 is located in the introduction portion flow path 682, and opens and closes the introduction portion flow path 682. The apparatus-side valve body 685 is formed with an arrangement portion 686. The arrangement portion 686 is a part of the apparatus-side valve body 685 whose size in the direction orthogonal to the central axis CA1 is larger than the other part. The arrangement portion 686 faces the apparatus-side valve seat 687. A sealing member 688, which is an annular elastic member, is attached to the arrangement portion 686. The sealing member 688 is formed of elastomer or a rubber. The sealing member 688 airtightly abuts against the apparatus-side valve seat 687 in a state in which the liquid introduction portion 642 and the liquid supply portion 442 are not coupled to each other, thus closing the apparatus-side valve hole 689 of the apparatus-side valve seat 687 by the apparatus-side valve body 685. As a result, the apparatus-side valve body 685 is closed.

The apparatus-side biasing member 683 biases the apparatus-side valve body 685 in a direction toward the apparatus-side valve seat 687. The apparatus-side biasing member 683 is, for example, a helical compression spring. One end of the apparatus-side biasing member 683 abuts against the arrangement portion 686, and the other end thereof abuts against a pedestal 684. The pedestal 684 is a member forming the base end 642*a* (illustrated in FIG. 2) of the liquid introduction portion 642, and is attached to the introduction portion main body 680.

When the cartridge 4 is mounted, the cartridge-side valve mechanism 484 is opened by being pushed to the liquid introduction portion 642 and separating the cartridge-side valve body 486 from the cartridge-side valve seat 485. Meanwhile, when the cartridge 4 is mounted, the apparatus-side valve body 685 is open by being separated from the apparatus-side valve seat 687 of the introduction portion main body 680. The supply portion flow path 482 and the introduction portion flow path 682 are then coupled to each other. In the mounted state, the liquid accommodated in the liquid accommodating portion 450 flows into the supply portion flow path 482, flows from the supply portion flow path 482 to the introduction portion flow path 682, and is supplied to the liquid storage portion 699.

A-6. Detailed Description of Cap

The cartridge 4 may be mounted in the printing apparatus 10, and removed from the printing apparatus 10 after the liquid is supplied to the printing apparatus 10 through the liquid supply portion 442. In this case, since the liquid adheres to the supply portion flow path 482 of the liquid supply portion 442, the liquid may be dripped from the tip end of the supply portion flow path 482 to the outside the cartridge 4. In the present embodiment, the cap 490 for guiding the liquid to the liquid absorbing material 470 is attached to the liquid supply portion 442. As a result, it is possible to prevent the liquid from dripping from the liquid supply portion 442 of the cartridge 4 to the outside, as will be described below.

As illustrated in FIG. 6, the cap 490 has an annular shape. The cap has a circular plate portion 491, an annular portion 492, a plurality of grooves 493, a plurality of holes 495, and a cap insertion port 498. As illustrated in FIG. 8, the circular plate portion 491 extends in a direction orthogonal to the central axis CA2. The annular portion 492 rises from a side where the cartridge-side valve mechanism 484 is located in an axial direction along the central axis CA2 with an outer periphery of the circular plate portion 491 as a base end. The cap 490 is fixed to the housing 480 by fitting the annular portion 492 into a downstream end portion thereof in the circulating direction of the liquid in the housing 480.

The circular plate portion 491 has a first surface 496 facing the cartridge-side valve seat 485, and a second surface 497 opposite to the first surface 496 and facing the first surface 496. A thickness of the circular plate portion 491 is uniform, and step is formed on the first surface 496. Here, the thickness of the circular plate portion 491 is a distance between the first surface 496 and the second surface 497 in a direction of the central axis CA2. Specifically, the step of the first surface 496 is formed to get closer to the second surface 497 in a direction from the cap insertion port 498 to the annular portion 492. A thickness of the circular plate portion 491 on the annular portion 492 side is thinner than a thickness of the circular plate portion 491 on the cap insertion port 498 side. The second surface 497 is in contact with the liquid absorbing material 470. The circular plate portion 491 is provided with the cap insertion port 498 into which the liquid introduction portion 642 is inserted, and the plurality of holes 495 formed on an outer peripheral side thereof from the cap insertion port 498. The cap insertion port 498 is located in a central region of the circular plate portion 491 and penetrates through the circular plate portion 491. That is, the cap insertion port 498 is formed over the first surface 496 and the second surface 497. As illustrated in FIG. 5, upon mounting of the cartridge 4, the liquid introduction portion 642 is inserted into the cap insertion port 498. As illustrated in FIG. 8, each of the plurality of holes 495 penetrates through the circular plate portion 491 at an edge portion of the circular plate portion 491. That is, each of the plurality of holes 495 is formed over the first surface 496 and the second surface 497. As illustrated in FIG. 6, the number of the plurality of holes 495 is eight in the present embodiment. The plurality of holes 495 are formed at intervals in a circumferential direction of the circular plate portion 491.

The plurality of grooves 493 extend in a radial direction of the first surface 496, which is a separating direction in which the grooves are separated from the cap insertion port 498, with an inner peripheral surface of the annular portion 492 as one end. Eight grooves 493 are formed at intervals in the circumferential direction. The groove 493 has a bottom surface 493*a* and two side surfaces 493*b* rising from both end portions of the bottom surface 493*a* in the circumferential direction. Two corners 493*c* are formed by the bottom surface 493*a* and the two side surfaces 493*b*. The corner 493*c* extends along a direction in which the groove 493 extends. A shape of one groove 493 when viewed in the direction in which the groove 493 extends is a rectangle with the first surface 496 side open. As illustrated in FIG. 8, the groove 493 is formed to have a substantially uniform depth, and the groove 493 also has a step formed therein along the step of the first surface 496. The hole 495 coupled with the groove 493 is arranged in the other end of the groove 493. The hole 495 has an inner peripheral surface 495*a*. The hole 495 is in contact with the annular portion 492, and a part of the inner peripheral surface 495*a* is located on a side wall of the annular portion 492. As illustrated in FIG. 6, a corner portion 495*b* recessed outward is formed on the inner peripheral surface 495*a*. The corner 493*c* of the groove 493 and the corner portion 495*b* of the hole 495 are coupled to each other. In the present embodiment, a shape of the hole 495 when viewed in a direction of the central axis CA2 is a rectangle.

As illustrated FIG. 8, the groove 493 faces the cartridge-side valve seat 485. The hole 495 is in contact with the liquid absorbing material 470. That is, the hole 495 and the second surface 497 partitioning the hole 495 around the hole 495 is in contact with the liquid absorbing material 470. One end of the groove 493 is arranged in the vicinity of the protruding portion 485*b* of the cartridge-side valve seat 485. As described above, the cartridge 4 is removed from the printing apparatus 10, it is rotatably moved in a coupling direction CD3 indicated by an arrow based on a rotation fulcrum 698, and thus becomes a state illustrated in FIG. 4. In this case, the central axis CA2 is the gravity direction. Thus, the liquid adhering to the inner peripheral surface that forms the valve seat insertion port 485*a* of the cartridge-side valve seat 485 is collected near the protruding portion 485*b*. Since one end of the groove 493 is arranged in the vicinity of the protruding portion 485*b*, the liquid near the protruding portion 485*b* is transmitted to an outer peripheral surface of the protruding portion 485*b* and guided to the groove 493. The groove 493 has the corner 493*c* formed by the bottom surface 493*a* and the side surfaces 493*b*. Therefore, the liquid that has entered the groove 493 is transmitted to the corner 493*c* by the capillary force. The corner 493*c* of the groove 493 and the corner portion 495*b* of the hole 495 are coupled to each other, and thus the liquid is further guided to the hole 495 by the capillary force. The hole 495 is in contact with the liquid absorbing material 470, and thus the liquid that has entered the hole 495 is absorbed by the liquid absorbing material 470. As such, the liquid adhering to the cartridge-side valve seat 485 is transmitted to the groove 493 and the hole 495 formed in the cap 490, and absorbed by the liquid absorbing material 470. Therefore, it is possible to prevent the liquid from dripping from the supply portion flow path 482 to the outside of the cartridge 4.

According to the present embodiment, the cartridge 4 has the cap 490 which is located downstream of the cartridge-side valve seat 485 in the circulating direction of the supply portion flow path 482 when the liquid is supplied. The cap 490 has a first surface 496 facing the cartridge-side valve seat 485, and a second surface 497 in contact with the liquid absorbing material 470. The first surface 496 has a groove 493 facing the cartridge-side valve seat 485, and a hole 495 coupled to the groove 493. Accordingly, the liquid adhering to the valve seat insertion port 485*a* of the cartridge-side valve seat 485 is transmitted to an outer surface of the cartridge-side valve seat 485, and guided to the groove 493 facing the cartridge-side valve seat 485, due to insertion/removal of the liquid introduction portion 642 of the printing apparatus 10. The liquid that has entered the groove 493 is further transmitted to the groove 493, and is absorbed by the liquid absorbing material 470 through the hole 495 that is coupled to the groove 493. Thus, it is possible to prevent the liquid from dripping from the supply portion flow path 482 to the outside of the cartridge 4.

According to the above-described embodiment, the cap 490 has a plurality of grooves 493. As a result, it is possible to fully absorb the liquid adhering to the valve seat insertion port 485*a*, and to prevent the liquid from dripping to the outside of the cartridge 4 over the whole periphery of the valve seat insertion port 485*a*.

According to the above-described embodiment, the groove 493 has a bottom surface 493*a* and two side surfaces 493*b* rising from the bottom surface 493*a*. The corner 493*c* is formed by the bottom surface 493*a* and the side surfaces 493*b*. Therefore, the liquid is transmitted to the corner 493*c* by the capillary force, such that the liquid can be reliably guided to the hole 495. Moreover, the hole 495 has an inner peripheral surface 495*a* having the corner portion 495*b* formed to be recessed outward. The corner portion 495*b* is coupled to the corner 493*c*. Therefore, the liquid is transmitted to the corner portion 495*b* by the capillary force, such that the liquid can be reliably guided to the liquid absorbing material 470 through the hole 495.

According to the above-described embodiment, the groove 493 extends in the radial direction, which is a direction spaced apart from the cap insertion port 498. The hole 495 is formed in an end portion of the groove 493. As a result, it is possible to arrange the liquid absorbing material 470 away from the cap insertion port 498. It is possible to enhance a degree of freedom in arrangement of the liquid absorbing material 470.

B. Other Embodiments

B-1. Other Embodiment 1

In the above-described embodiment, eight grooves 493 and eight holes 495 are formed in the cap 490. The numbers of the grooves 493 and the holes 495 are not limited to eight, and may be one. The groove 493 and the hole 495 are formed in the cap 490 regardless of the number, such that it is possible to prevent the liquid from dripping to the outside of the cartridge 4.

B-2. Other Embodiment 2

According to the above-described embodiment, a shape of the groove 493 is a rectangle with the first surface 496 side open. The shape of the groove 493 is not limited to the rectangle, and may be a polygon. A corner is formed on a plurality of surfaces forming the groove 493 regardless of the shape, such that the liquid can be reliably guided along the corner due to the capillary force acting on the formed corner. This applies the same to the hole 495. That is, in the present embodiment, a shape of the hole 495 is not limited to the rectangle, and may be a polygon.

B-3. Other Embodiment 3

In the present embodiment, one hole 495 is provided for one groove 493. Separately, one hole 495 may be provided for the plurality of grooves 493. In addition, a plurality of holes 495 may be provided for one groove 493. The hole 495 is coupled to the groove 493 regardless of an arrangement form of the groove 493 and the hole 495, such that the liquid absorbing material 470 can absorb the liquid guided to the groove.

B-4. Other Embodiment 4

The present disclosure is not limited to an ink jet printer and an ink cartridge thereof, but can be applied to any printing apparatus that ejects other liquids except for ink and a cartridge thereof. For example, various printing apparatuses and cartridges thereof can be applied as follows.

(1) Image recording apparatus such as a fax machine
(2) Printing apparatus that ejects color materials used in manufacturing a color filter for an image display apparatus such as a liquid crystal display
(3) Printing apparatus that ejects electrode materials used in forming electrodes such as an organic electroluminescence (EL) display or field emission display (FED)
(4) Printing apparatus that ejects a liquid including bio-organic matters used in manufacture of a biochip
(5) Sample printing apparatus as precision pipette
(6) Printing apparatus of lubricating oil
(7) Printing apparatus of resin liquid
(8) Printing apparatus that ejects lubricating oil to a precision machine, such as a watch and a camera, with a pinpoint
(9) Printing apparatus that ejects a transparent resin liquid, such as an ultraviolet curable resin liquid, to a substrate to form a micro-hemispherical lens (optical lens) used for an optical communication element or the like
(10) Printing apparatus that ejects an acidic or alkaline etching solution to etch a substrate or the like
(11) Printing apparatus including a liquid ejecting head that discharges any other minute amount of liquid droplets The "liquid droplets" refers to a state of the liquid discharged from the printing apparatus, and includes those having particle-like, tear-like, or thread-like trails. In addition, the "liquid" here may be any material that can be ejected by the printing apparatus. For example, the "liquid" may be a material in a state where the substance is in a liquid phase, and liquid materials with high or low viscosity and liquid materials such as sol, gel water, other inorganic solvents, organic solvents, solutions, liquid resins, and liquid metal are also included in the "liquid". In addition, the "liquid" includes not only a liquid as one state of a substance but also a "liquid" obtained by dissolving, dispersing or mixing particles of a functional material made of a solid such as a pigment or metal particles in a solvent. In addition, representative examples of the liquid include ink and liquid crystal as described in the above embodiment. Here, the ink includes various liquid compositions such as normal water-based ink and oil-based ink, gel ink, and hot-melt ink.

C. Other Aspects

The present disclosure is not limited to the above-described embodiment, and can be realized with various configurations without departing from the spirit of the present disclosure. For example, the technical features of the embodiments corresponding to the technical features in each embodiment described below can be appropriately replaced or combined to solve some or all of the above-described problems, or to achieve some or all of the above effects. In addition, when the technical feature is not described as essential in the present specification, it can be deleted as appropriate. In addition, when the technical feature is not described as essential in the present specification, it can be appropriately deleted.

(1) According to a first aspect of the present disclosure, there is provided a cartridge that is detachably mounted in a liquid ejecting apparatus including a liquid introduction portion. The cartridge includes: a liquid accommodating portion for accommodating a liquid; a liquid supply portion having a supply portion flow path that communicates with the liquid accommodating portion; a valve seat arranged on the supply portion flow path and having a valve seat insertion port into which the liquid introduction portion is inserted; a valve body for closing the valve seat insertion port, arranged on the supply portion flow path, the valve body being located upstream of the valve seat in a circulating direction of the liquid in the supply portion flow path when the liquid is supplied; a biasing member arranged on the supply portion flow path and biasing the valve body toward the valve seat; a cap located downstream of the valve seat in the circulating direction; and a liquid absorbing material in contact with the cap. The cap has a first surface facing the valve seat, a second surface facing the first surface and in contact with the liquid absorbing material, a cap insertion port formed over the first surface and the second surface, into which the liquid introduction portion is inserted, a groove formed in the first surface and facing the valve seat, and a hole formed over the first surface and the second surface and coupled to the groove. The hole is in contact with the liquid absorbing material. According to the aspect, the liquid adhering to the valve seat insertion port of the valve seat is transmitted to an outer surface of the valve seat, and guided to the groove facing the valve seat, due to insertion/removal of the liquid introduction portion of the liquid ejecting apparatus. The liquid that has entered the groove is further transmitted to the groove, and is absorbed by the liquid absorbing material that is in contact with the hole through the hole that is coupled to the groove. Thus, it is possible to prevent the liquid from dripping from the supply portion flow path to the outside of the cartridge.

(2) In the aspect, the cap may have a plurality of grooves. According to the aspect, it is possible to fully absorb the liquid adhering to the valve seat insertion port, and to prevent the liquid from dripping to the outside of the cartridge over the whole periphery of the valve seat insertion port.

(3) In the aspect, the groove may have a bottom wall and side surfaces rising from the bottom surface, and a corner may be formed by the bottom surface and the side surfaces. According to the aspect, the liquid is transmitted to the corner by a capillary force, such that the liquid can be reliably guided to the hole.

(4) In the aspect, the hole may have an inner peripheral surface having a corner portion formed to be recessed outward, and the corner portion may be coupled to the corner. According to the aspect, the liquid guided to the corner of the groove is further transmitted to the corner portion by the capillary force, such that the liquid can be reliably guided to the liquid absorbing material.

(5) In the aspect, the groove may extend in a separating direction in which the groove is separated from the cap insertion port, and the hole may be formed on an end portion of the groove in the separating direction. According to the aspect, it is possible to arrange the liquid absorbing material away from the cap insertion port. It is possible to enhance a degree of freedom in arrangement of the liquid absorbing material.

In addition to the aspect described above, the present disclosure can be realized as an aspect such as a method of manufacturing a cartridge, a liquid supply portion of the cartridge, or the like.

What is claimed is:

1. A cartridge that is detachably mounted in a liquid ejecting apparatus including a liquid introduction portion, the cartridge comprising:

- a liquid accommodating portion for accommodating a liquid;
- a liquid supply portion having a central axis and a supply portion flow path that communicates with the liquid accommodating portion;
- a valve seat arranged on the supply portion flow path and having a valve seat insertion port into which the liquid introduction portion is inserted;
- a valve body for closing the valve seat insertion port, arranged on the supply portion flow path, the valve body being located upstream of the valve seat in a circulating direction of the liquid in the supply portion flow path when the liquid is supplied;
- a biasing member arranged on the supply portion flow path and biasing the valve body toward the valve seat;
- a cap located downstream of the valve seat in the circulating direction; and
- a liquid absorbing material in contact with the cap, wherein the cap has

- a first surface facing the valve seat,
- a second surface facing the first surface and in contact with the liquid absorbing material,
- a cap insertion port formed over the first surface and the second surface, into which the liquid introduction portion is inserted,
- a groove formed in the first surface and facing the valve seat, the groove extending in a radially direction of the central axis, and
- a hole formed over the first surface and the second surface and coupled to the groove, and the hole is in contact with the liquid absorbing material.

2. The cartridge according to claim 1, wherein the cap has a plurality of grooves.

3. The cartridge according to claim 1, wherein the groove has a bottom wall and side surfaces rising from the bottom surface, and a corner is formed by the bottom surface and the side surfaces.

4. The cartridge according to claim 3, wherein the hole has an inner peripheral surface having a corner portion formed to be recessed outward, and the corner portion is coupled to the corner.

5. The cartridge according to claim 1, wherein the groove extends in a separating direction in which the groove is separated from the cap insertion port, and the hole is formed on an end portion of the groove in the separating direction.

* * * * *